US010429870B2

(12) United States Patent
Conroy et al.

(10) Patent No.: US 10,429,870 B2
(45) Date of Patent: Oct. 1, 2019

(54) STARTUP CONTROL FOR MULTI-DROP TRANSMITTERS POWERED BY CURRENT LIMITED POWER SUPPLIES

(71) Applicant: HONEYWELL INTERNATIONAL INC., Morris Plains, NJ (US)

(72) Inventors: Michael Conroy, Vancouver (CA); Cristian Andronic, Burnaby (CA)

(73) Assignee: Honeywell International Inc., Morris Plains, NJ (US)

( * ) Notice: Subject to any disclaimer, the term of this patent is extended or adjusted under 35 U.S.C. 154(b) by 317 days.

(21) Appl. No.: 15/365,197

(22) Filed: Nov. 30, 2016

(65) Prior Publication Data

US 2018/0150094 A1 May 31, 2018

(51) Int. Cl.
*G05B 11/01* (2006.01)
*G05F 1/66* (2006.01)

(52) U.S. Cl.
CPC .................................... *G05F 1/66* (2013.01)

(58) Field of Classification Search
CPC .................................. G05B 15/02; G05F 1/66
USPC .......................................................... 700/22
See application file for complete search history.

(56) References Cited

U.S. PATENT DOCUMENTS

| | | | |
|---|---|---|---|
| 6,295,018 | B1 | 9/2001 | Diede et al. |
| 6,867,729 | B2 | 3/2005 | Berry et al. |
| 8,752,433 | B2 | 6/2014 | Hedtke |
| 8,786,128 | B2 | 7/2014 | Schulte |
| 2016/0146924 | A1 | 5/2016 | Williams |

*Primary Examiner* — Tan N Tran

(57) ABSTRACT

A method of operating process variable transmitters configured for sensing within an industrial processing facility connected in parallel to a current loop that receives power from a common power supply. The transmitters include a power accumulator module including an energy storage device including at least one capacitor or a rechargeable battery and a sensor module including a transceiver coupled to a processor having an associated memory that stores a startup sequencing algorithm. After a fixed period of time following a startup, an initial node voltage is measured across the energy storage device. The initial node voltage is compared to a predetermined voltage, and the transmitter is placed in a low power mode when the initial node voltage is <the predetermined voltage, an at least partially random low power state time for the transmitter is set, and startup sequencing algorithm is restarted after the low power time.

15 Claims, 6 Drawing Sheets

STARTUP CONTROL FOR MULTI-DROP TRANSMITTERS POWERED BY CURRENT LIMITED POWER SUPPLIES

FIELD

Disclosed embodiments relate to the powering of process variable transmitters in process control systems of industrial processing facilities that are connected in multi-drop or constant current loop network configurations.

BACKGROUND

Industrial processing facilities are often managed using process control systems. Example industrial processing facilities include manufacturing plants, chemical plants, crude oil refineries, and ore processing plants. Among other operations, process control systems typically manage the use of motors, valves, and other industrial equipment in the processing facilities. Radar level gauges (RLGs) are commonly used for measurements of the level of products such as process fluids, granular materials and other materials. A radar level gauge generally includes a transceiver for transmitting and receiving microwaves, a propagation device (e.g., an antenna) or a guided wave probe (i.e. transmission line suspended from top to bottom in the tank) arranged to direct microwaves and to couple returned microwaves affected by the product surface to the transceiver, timing circuitry adapted to control the transceiver and to determine the level based on a time relation between microwaves transmitted and received by the transceiver, and an interface arranged to receive power and to connect the radar level gauge externally thereof.

Fieldbus is the name of a family of digital industrial computer network protocols used for real-time distributed control of process control systems. A complex automated industrial system, such as a manufacturing assembly line, usually has a distributed control system that is organized as a hierarchy of controller systems. In this hierarchy, there is usually a Human Machine Interface (HMI) at the top level, where an operator can monitor or operate the system. This is typically linked to a middle layer of programmable logic controllers (PLC) via a non-time-critical communications system (e.g. Ethernet). At the bottom level of the control chain is the fieldbus that links the PLCs to the components that actually do the processing work, such as sensors (a type of transducer which senses a process variable which may include a transmitter referred to herein a process variable transmitter) and actuators, which may be collectively referred to as field devices, as well as processing equipment including tanks, burners and electric motors, console lights, switches, valves and contactors. The Highway Addressable Remote Transducer (HART) communications protocol is an early implementation of Fieldbus.

In addition to Fieldbus and HART, a set-point (PV, process variable) can be transmitted through current loop value provided from an analog output. The common industrial range for loop current HART devices is 4 mA-20 mA. HART communication overlays the traditional current loop (single value) method to provide additional measurement and diagnostic information.

The HART protocol makes use of the Bell 202 Frequency Shift Keying (FSK) standard to superimpose digital communication signals (using Frequency Shift Keying to encode digital information where a logical “1” is represented by a frequency of 1,200 Hz and a logical “0” is represented by a frequency of 2,200 Hz) on top of 4 to 20 mA DC analog signal at a low relative signal level. This enables two-way field communication to take place and makes it possible for additional information beyond the normal process variable to be communicated to/from a smart field instrument. The HART Protocol communicates at 1200 bps without interrupting the 4 to 20 mA signal and allows a host application (Hart master, such as a PLC) to get two or more digital updates per second from a smart field device. As the digital FSK signal is phase continuous, there is no interference with the 4 to 20 mA loop current analog signal. Additional device information is communicated using the digital signal. The digital signal in the case of a sensor generally includes device status, diagnostics, and additional measured or calculated values. Together, the two communication channels provide a low-cost and robust complete field communication solution that is generally easy to use and configure.

The HART Protocol permits all digital communication with field devices including process variable transmitters in either point-to-point or multidrop network configurations. In the multidrop mode the analog loop current in the HART enabled device is generally fixed at 4 mA in steady (quiescent) state, and it is possible to have more than one field device on one signal cable thus sharing a loop current coming from a common DC power supply. In this case each field device on the common line needs to have a unique HART communication address (or ID). The loop current analog output is not controlled anymore (other than for powering devices), its value is fixed, and PVs and data is provided solely through HART communication.

In the case of a sensor comprising a process variable transmitter, one example is a Guided Wave Radar (GWR) transmitter commonly used for level sensing in a tank, where the 4 to 20 mA current is output in the loop by the GWR transmitter device. Such GWR transmitters generally are two wire devices which need a DC power supply providing about 10 to 28 VDC and a minimum load HART termination resistance of about 250 Ohm within the loop to properly operate.

SUMMARY

This Summary is provided to introduce a brief selection of disclosed concepts in a simplified form that are further described below in the Detailed Description including the drawings provided. This Summary is not intended to limit the claimed subject matter’s scope.

Disclosed embodiments recognize for control systems in industrial processing facilities having field devices configured in a multi-drop network configuration, there may be a plurality of process variable transmitters connected electrically in parallel on a common line to receive loop current from the same power supply. Due to the power requirements of process variable transmitters such as radar sensors (e.g., GWR transmitters) particularly at startup, the power supply is needed to source a high initial current level (e.g., the full 21.5 mA for HART-compliant transmitters) for a short time at startup of each radar transmitter, such as for a few seconds, after which the radar transmitter will run at a relatively low constant loop current (e.g., 4 mA for HART compliant devices).

If there is only one process variable transmitter on the common line then this is not a problem. However if there are N process variable transmitters on the common line and they all are switched on at essentially the same time, then the power supply needs to source a current equal to 21.5 mA*N for the first few seconds after startup to allow device configuration and switch to 4 mA constant loop current for the multi drop mode. In the particular case of 5 process variable transmitters, the required initial power supply current at startup is in excess of 107.5 mA. It is recognized that most power supplies and IO HART interface cards used in HART process control systems are not configured to supply this required startup current level, and as a result the process variable transmitters will be current starved due to failing to receive the needed current for startup. Startup failures generally require a customer (typically an equipment maintenance tech) to manually go out to each process variable transmitter and manually power them ON in a staggered sequence which is at best annoying and resulting in process downtime, and at worst potentially not even possible due to lack of access to the transmitter supply terminals which can be distributed all over the plant/system.

Disclosed embodiments apply to process variable transmitters that have an energy storage device, such as certain GWR transmitters that have a power accumulator module for energy harvesting including and an energy storage device that includes at least one capacitor or a rechargeable battery. The capacitor is known to be a circuit element that stores energy in an electric field that can be developed during charging across its plates which are separated by a dielectric. A rechargeable battery (or secondary cell, or accumulator) is a type of electrical battery that has terminals which can be charged, discharged into a load, and recharged many times. Rechargeable batteries are recharged by applying electric current, which reverses internal chemical reactions that occur during discharge (use).

The energy storage device can be a single capacitor, bank of capacitors, or an energy storage circuit including a capacitor(s) that can optionally also include one or more active components (e.g., transistors) which can store energy, and also generally measure its stored power during the low power mode. The rechargeable battery can also be positioned electrically in parallel with capacitor(s). In this embodiment a switching path circuit can connect either storage device depending on tasks to be run. For example, for long duration processing (i.e. echo capture for level sensing) a rechargeable battery will generally provide continuous energy, while for a short level measurement capacitor(s) will generally be sufficient.

The energy storage device voltage/charge is monitored by internal (monitor) electronics to determine the charging rate, corresponding to available loop current. For example, assume that during startup capacitor(s) are connected to the loop and current is monitored in the same way. One does not to make any changes. If a rechargeable battery is connected instead, one will still monitor the charging current and go into low power mode (allow the battery to charge and get the at least pseudo-random start time) if multiple devices are powered up the same time. The process variable transmitters are configured to measure a process variable of an industrial process.

One disclosed embodiment comprises a method of operating process variable transmitters in multi-drop network configurations. A plurality of process variable transmitters configured for sensing a process variable are provided within an industrial processing facility. The process variable transmitters are each connected in electrically parallel to a limited current loop that receives power from a common power supply. The process variable transmitters each include a power accumulator module comprising an energy storage device including at least one capacitor, or a rechargeable battery, and a sensor module including a transceiver coupled to a processor having an associated memory that stores a disclosed startup sequencing algorithm. After a fixed period of time following a startup of the process variable transmitter, an initial node voltage is measured across plates of the energy storage device. The initial node voltage is compared to a predetermined voltage level.

The process variable transmitter is placed in a low power mode when the initial node voltage is less than the predetermined voltage level indicating a lower/limited supply voltage. An at least partially random low power state time is set for the process variable transmitter. The at least partially random low power state times for the respective process variable transmitters will not be the same. The startup sequencing algorithm restarts the respective process variable transmitter after their low power state times.

BRIEF DESCRIPTION OF THE DRAWINGS

FIG. 3A depicts a GWR system showing basic components of an example GWR level transmitter connected by a process connection to a probe, while

DETAILED DESCRIPTION

Figure 1:
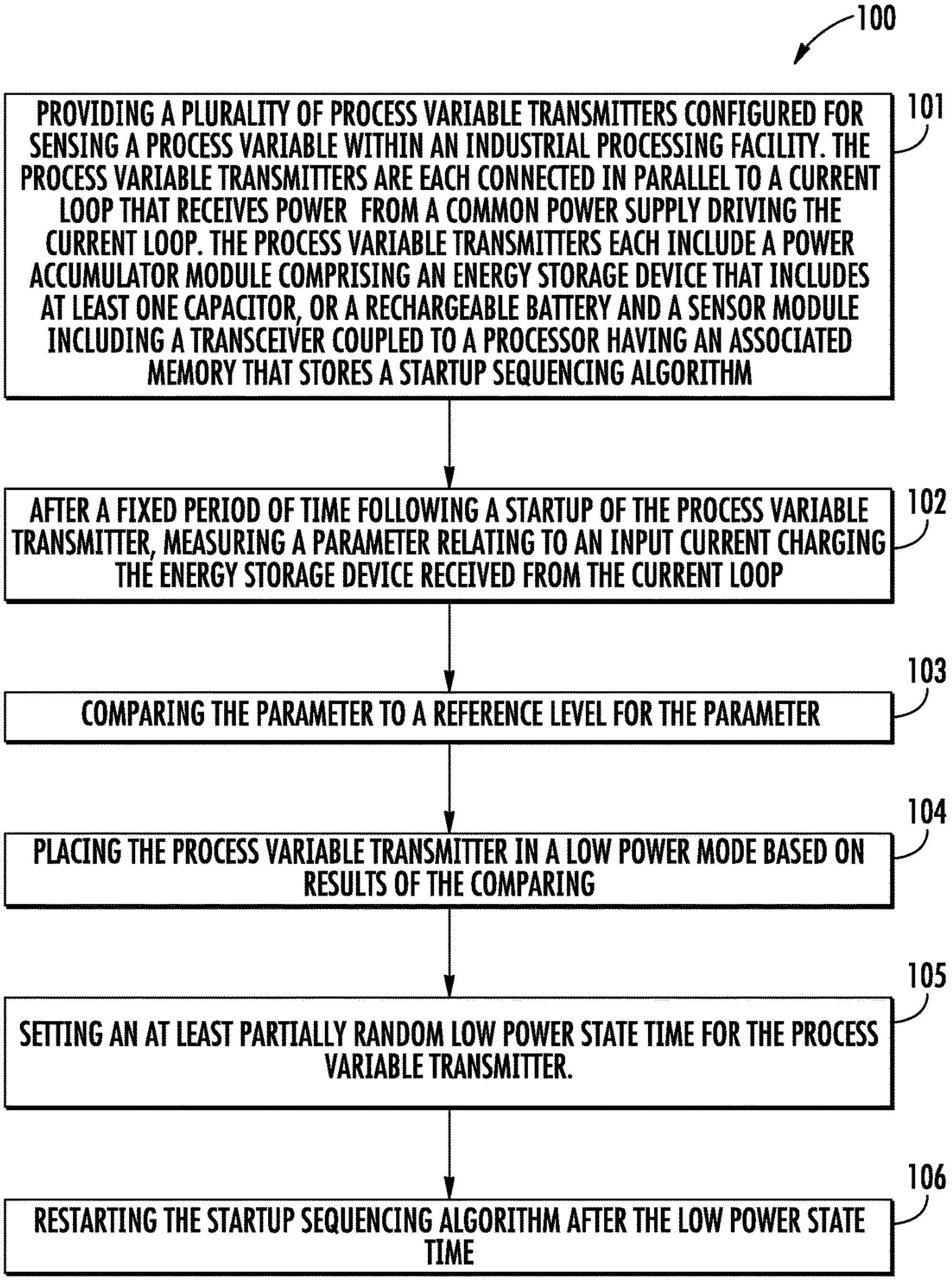
FIG. 1 is a flow chart showing steps for an example method of operating process variable transmitters in multi-drop network configurations, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed embodiments apply to process variable transmitters which are configured externally and individually in multidrop mode, before being connected to a loop. In the multidrop mode (a constant current mode), the transmitter runs at a preset loop current, 4 mA in most of the industrial devices using the HART protocol. This allows multiple field devices such as process variable transmitters to act as "slaves" on the loop, and communicate over digital (e.g., HART) communication with the supervisory system(s) including the HART master. Each field device will have a 'name' (e.g., for 5 bit addressing, the DeviceID can be from 1 to 31 while 0 is reserved for master, or single loop device). Multidrop configured field devices will have a different startup current, before their firmware/software changes the loop to the constant current (e.g., 4 mA). Accordingly, the loop does not change to 4 mA immediately after the device is connected to power. Instead, it generally takes milliseconds to seconds until the loop current changes to its quiescent value of 4 mA.

FIG. 1 is a flow chart showing steps for an example method 100 of operating process variable transmitters in multi-drop network configurations, according to an example embodiment. Being in a multi-drop mode is a system configuration setting, and in the case of a HART-compatible transmitter, is set via a HART command received from a HART master (a control system or other host application). Disclosed methods can be implemented in only firmware changes to commercially available process variable transmitters (e.g., no hardware changes to the HART board or the GWR sensor board). The process variable transmitter at the stack level includes a sensor comprising a hardware device with some embedded software for measuring/detecting and transmitting data (e.g. process variables such as temperature, pressure, motion, or a level) and embedded software (e.g. firmware) which runs in the operating process variable transmitter.

Step 101 comprises providing a plurality of process variable transmitters configured for sensing a process variable within an industrial processing facility. In one specific embodiment the process variable transmitter comprises a GWR radar transmitter coupled by a process connection (e.g., a coaxial feed-through) through a tank aperture to a probe in a tank. The process variable transmitters are each connected in parallel to a current loop that all receive power from a common DC power supply driving the current loop.

The process variable transmitters each include a power accumulator module comprising an energy storage device that includes at least one capacitor (e.g., an energy storage device bank, capacitor bank comprising a plurality of capacitors, 1 large value capacitor, and/or a rechargeable battery). The energy storage device besides providing an energy storage function generally also provides detecting at startup how much supply current is flowing into the associated transmitter. The process variable transmitter also includes a sensor module including a transceiver coupled to a processor (e.g. microprocessor, digital signal processor (DSP), or a microcontroller unit (MCU)) having an associated memory that stores a disclosed startup sequencing algorithm.

The process variable transmitter is a two-wire transmitter in the sense that it is an electronic transmitter that uses two wires for signal transmission and power. For example, two-wire process control loops can use 4-20 mA signaling techniques and digital communication techniques, such as HART®, FIELDBUS®, PROFIBUS®, or other communication protocol.

Step 102 comprises after a fixed period of time following a startup of the process variable transmitter, measuring a parameter relating to an input current charging the energy storage device(s) received from the current loop. An initial node voltage can be measured between the positive and negative terminal of the energy storage device, where the negative terminal may be at ground potential, but not need be at ground potential. In addition one can measure the Δvoltage across the plates or terminals of the energy storage device over a known time to measure the input current. It is also possible to measure the average voltage drop across a current sense resistor added in a path of the charging current, or other method of measuring the input current.

The fixed period of time used is the same for all the process variable transmitters in the loop. The measuring an initial node voltage senses the current during the first (ΔT) which is generally several seconds after startup. As there is a known capacitance (C) for the energy storage device and it is allowed to charge for a known time (ΔT) after startup, the voltage ΔV can be read across the energy storage device to determine if the process variable transmitter, in the case of HART, had the full startup current of 21 mA supplied to it, or had a current less supplied indicating another process variable transmitter on the current loop that was started at the same time. Quantitatively, the voltage measured across a capacitor reached in a time ΔT charged by a charging current I is: $\Delta V = I\,\Delta T/C$, so that the I supplied to the process variable transmitter is found by $I = C\Delta V/\Delta T$. The actual current values in different embodiments (besides HART) may be different but this concept remains the same.

Step 103 comprises comparing the initial node voltage to a predetermined voltage level. The comparing can be performed by the startup sequencing algorithm or be performed by hardware that can provide variable thresholds. Step 104 comprises placing the process variable transmitter in a low power mode when the initial node voltage is less than the predetermined voltage level. A low power mode as used herein refers to a mode where the power used is below the power at the minimum current available in the loop (e.g., 4 mA for HART, so for a 20V loop voltage, a current of 100 μA would be a power of 2 mW (vs. 80 mW at 4 mA). Essentially a process variable transmitter when in low power state is essentially 'off'. One way in the case of a GWR is to put the processor to 'sleep', but in the general case it is just doing nothing in a low power mode. During this time process variable transmitter will not be transmitting.

Step 105 comprises setting an at least partially random (e.g., pseudo-random) low power state time for the process variable transmitter. The at least partially random time for the respective process variable transmitters will not be the same. In one embodiment the random time can be calculated via a function seeded with a value from some noise source. In this case it is not random in the strictest sense of the word, rather it is pseudo-random. An example seeding the random number generator is to read a pin with an analog to digital converter (ADC) in the transceiver that is floating and use the value to seed the time generator. There are a number of ways to obtain a random seed. This is how most 'random' numbers that are generated by computers work. As a result, the next time a given transmitter starts up (step 106), it will be the only one starting up as the other transmitters will still be in a low power mode.

The low power state startup time is expected to be in the 1 to 10 second range for commercially available GWR transmitters. Accordingly, one transmitter can wake up after 5 seconds, a second transmitter wake up after 10 seconds, etc. One can program the respective wake up times knowing the assigned HART device ID (i.e. address 1 to 31). As an example, the time to wake up from lower power mode can be the device ID# *5 seconds . . . Device 1—5 seconds, device 2—10 seconds . . . etc. The device ID is preconfigured inside the process variable transmitter before being connected in multidrop mode. The "pseudo-random time" can be used in cases where startup time is shorter or one wants a fully random sequence (not based on the device ID#). Step 106 comprises restarting the startup sequencing algorithm after the low power state time.

For example, if a plurality of process variable transmitters try to start at the same time (or essentially the same time) and their total startup current needs exceeds the current the power supply (or IO PLC card) can supply, the startup sequencing algorithm in each process variable transmitter will detect this (detected in step 103) and the respective process variable transmitters will all go into a low power mode (Step 104). The process variable transmitters will remain in the low power mode each for an at least partially random time interval (step 105), and then each process variable transmitter will attempt to restart again at a different time (step 106) to return method 100 to step 102.

Figure 2:
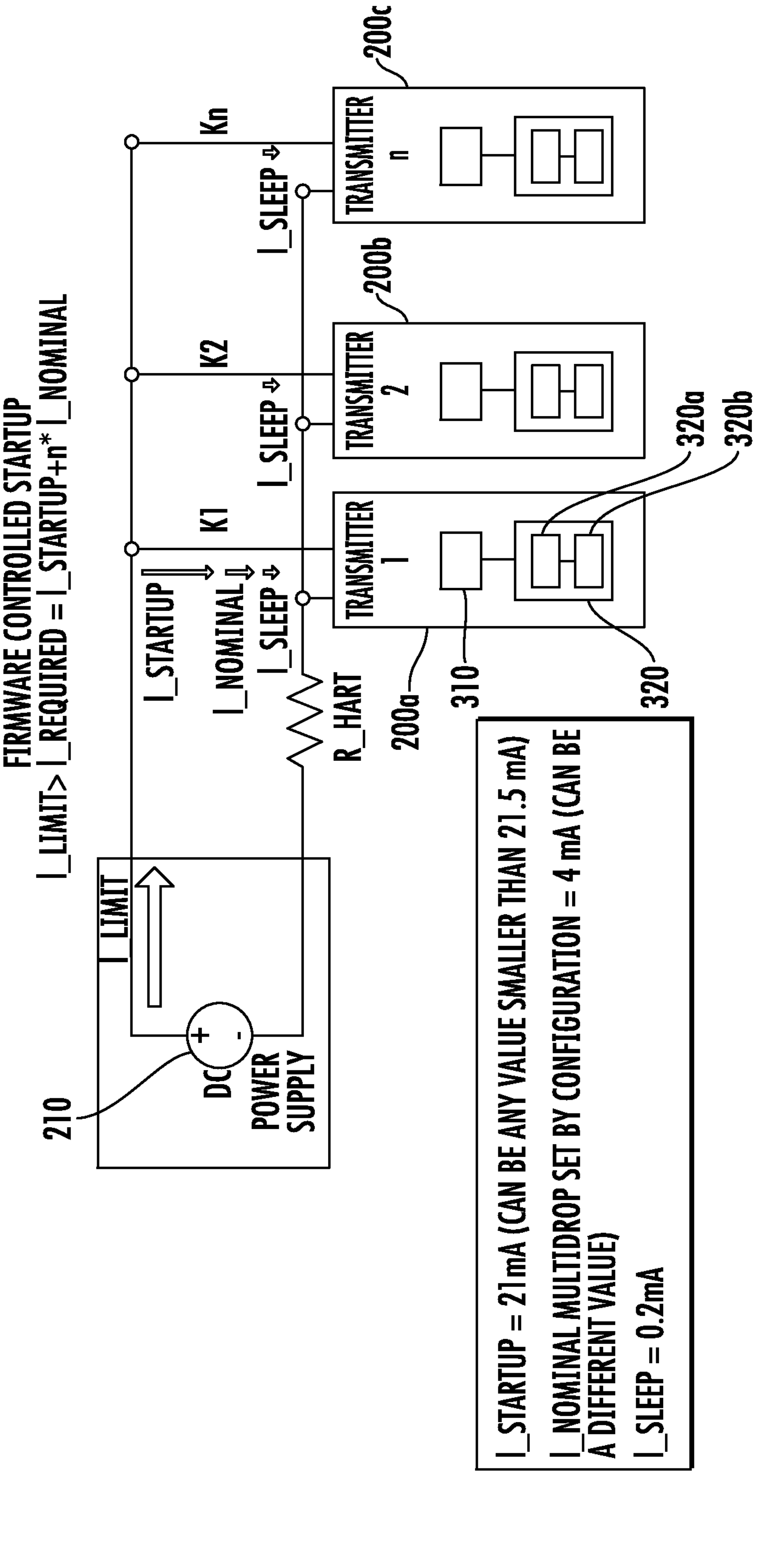
FIG. 2 depicts a plurality of disclosed HART transmitters configured in a multidrop setup each having in firmware a controlled startup for multi-drop transmitters powered by current limited power supply algorithm, according to an example embodiment.

FIG. 2 depicts a plurality of disclosed HART process variable transmitters shown as 200*a*, 200*b* and 200*c* configured in a multidrop setup each having a firmware controlled startup for multi-drop transmitters powered by current limited power supplies, according to an example embodiment. A DC power supply 210 powers the loop which includes a HART resistor shown as R_Hart in the loop that is generally at least 250 ohms for HART communications needed for the HART signal to develop and be read by HART devices. A minimum lower loop voltage range of about 15 V is the voltage from DC power supply 210 needed to drive the loop current through the R_Hart to provide a valid HART signal.

Figure 4:
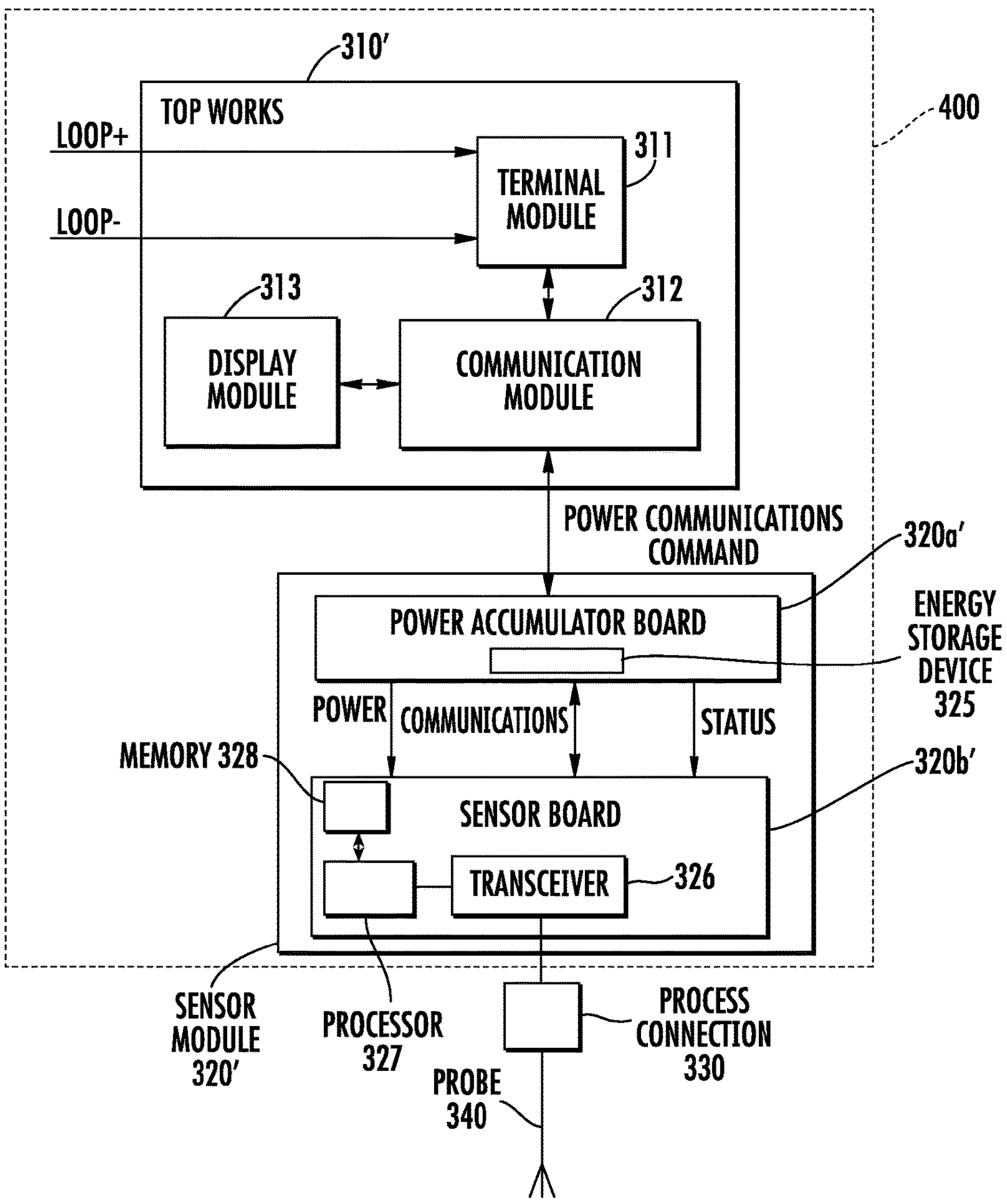
FIG. 4 depicts a GWR system showing several functional blocks and interconnections for both the top works and the sensor module of an example GWR level transmitter again shown connected by a process connection to a probe.

The process variable transmitters 200*a*, 200*b* and 200*c* are shown including a top works portion 310 and a sensor block 320 including a power accumulator 320*a* comprising an energy storage device including at least one capacitor and/or rechargeable battery and a sensor 320*b*. FIG. 4 described below shows details for an example top works and an example sensor module. A disclosed controlled startup for multi-drop transmitters powered by current limited power supplies algorithm is stored in firmware in the sensor 320*b* for each of the process variable transmitters 200*a*, 200*b* and 200*c*. The values for I_Startup are shown for example as being 21 mA, I_nominal as 4 mA and I_Sleep (or low power) of 0.2 mA. As described above, the multi-drop transmitter powered by current limited power supply algorithm when it senses the presence of other process variable transmitters drawing loop startup current sufficient to slow charging of the energy storage device places it in a low power mode with the respective low power state times being different to stagger the startup of the process variable transmitters 200*a*, 200*b* and 200*c*.

Figure 3A:
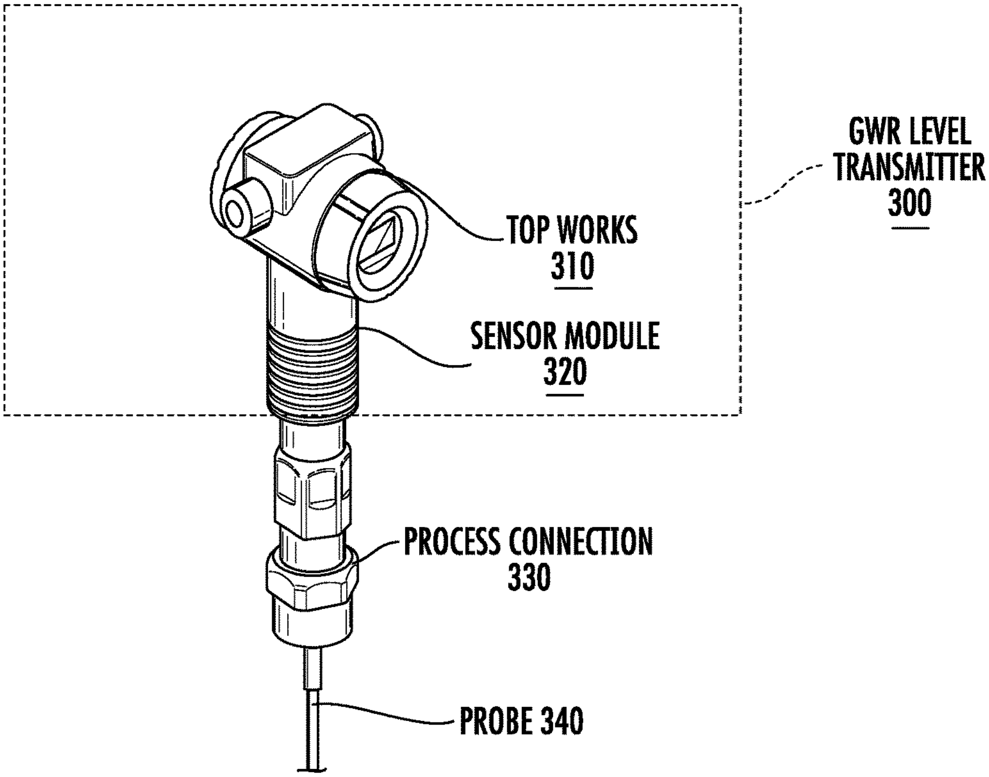
Figure 3B:
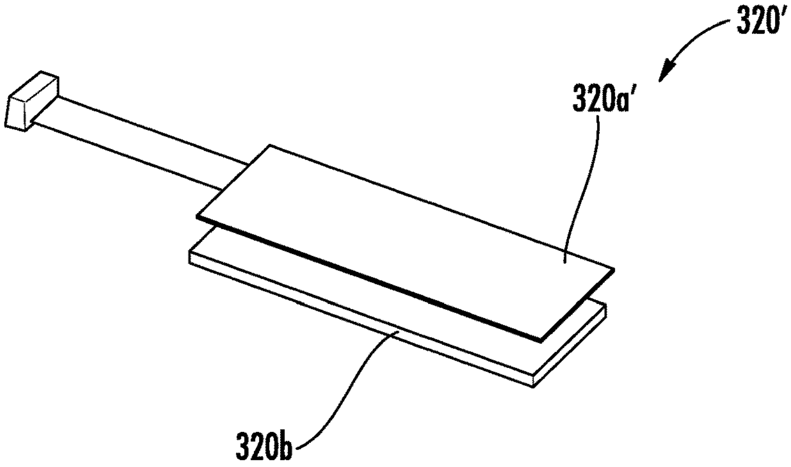
FIG. 3B depicts a stack-up arrangement of a power accumulator board and a sensor board.

FIG. 3A depicts basic components of an example GWR level transmitter 300. The GWR level transmitter 300 components shown include top works 310 and sensor module 320. The sensor module 320 includes a controlled startup for multi-drop transmitters powered by current limited power supplies algorithm. The sensor module 320 is coupled to a process connection 330 that is coupled to a probe 340. FIG. 3B depicts a stack-up arrangement for an example sensor module 320' comprising a power accumulator board 320*a'* and a sensor board 320*b'*.

FIG. 4 depicts a GWR system showing several functional blocks and interconnections for both the top works 310' and the sensor module 320' of an example GWR level transmitter 400 again shown connected by a process connection 330 to a probe 340. The top works 310' is shown including a terminal module 311 that is for connecting to the wires (LOOP+ and LOOP−) of the loop, a communications module 312 and a display module 313. The sensor module 320' is shown including a power accumulator board 320*a'* comprising an energy storage device 325 including at least one capacitor or a rechargeable battery and a sensor board 320*b'*. The sensor board 320*b'* is shown including a transceiver 326, a processor 327 and a memory 328.

Figure 5:
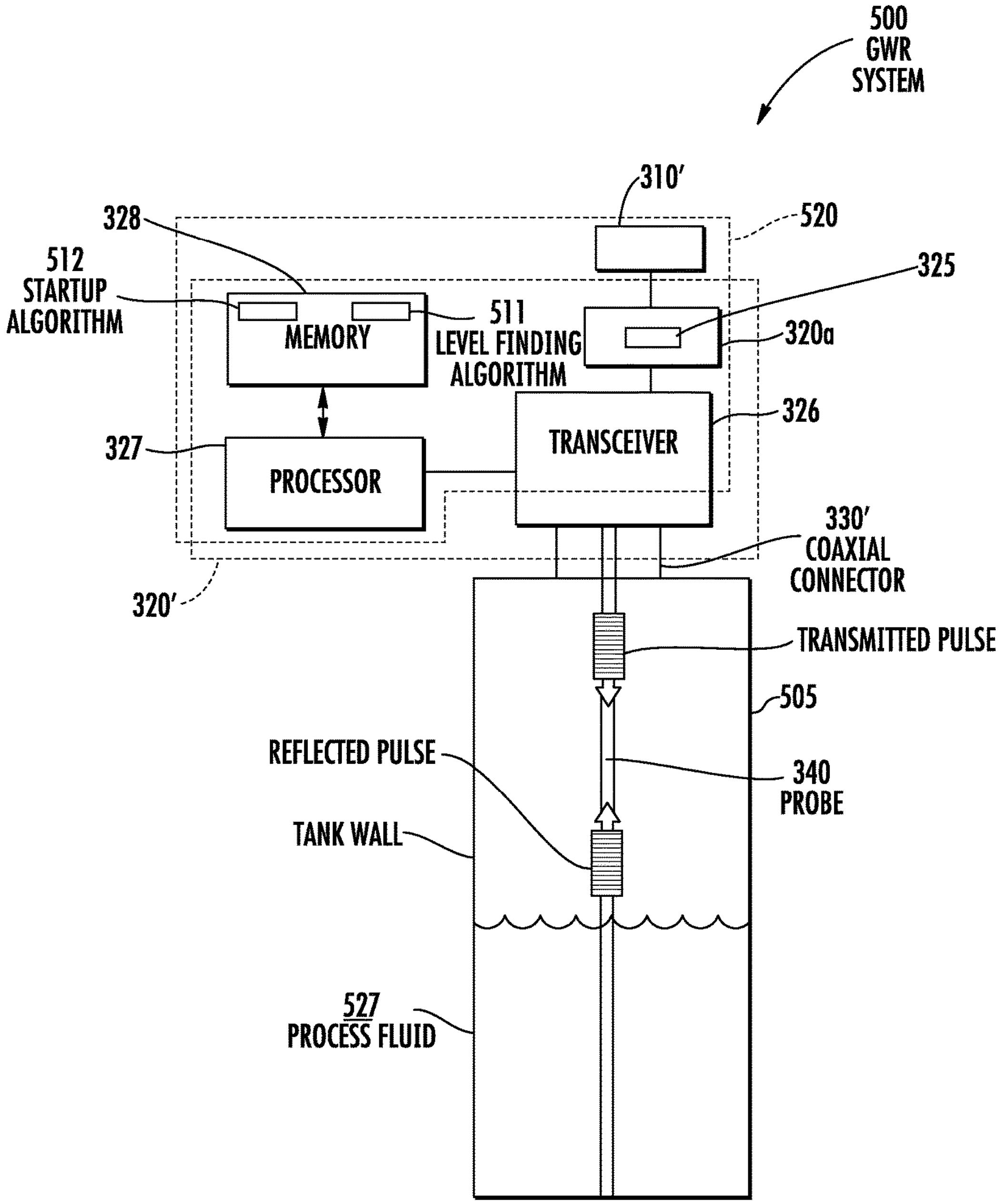
FIG. 5 depicts an example GWR system having a GWR level transmitter transceiver coupled by a process connection shown as coaxial connector to a probe in a tank, according to an example embodiment.

FIG. 5 depicts an example GWR system 500 having a GWR level transmitter transceiver 520 coupled by a process connection shown as coaxial connector 330' to a probe 340 in a tank, according to an example embodiment. A process fluid 527 is shown in the tank 505. The coaxial connector 330' is over an aperture in the top of the tank 505 with its center conductor coupled to the probe 340 (or waveguide) which extends into the tank 505. The GWR level transmitter transceiver 520 includes a processor 327 which has an associated memory 328, where the transceiver associated memory 328 is shown include a stored level finding algorithm 511 (e.g., a Time Domain Reflectometry (TDR) algorithm) and a disclosed startup algorithm 512.

A flange (not shown) may also be present on the top of the tank 505. In operation of the GWR system 500 a transmitted pulse from the transceiver 326 is launched along probe 340 which returns as the reflected pulse shown that is processed by the processor 327 running level finding algorithm 511. The transmitted pulse may be at a frequency of several GHz.

Figure 6:
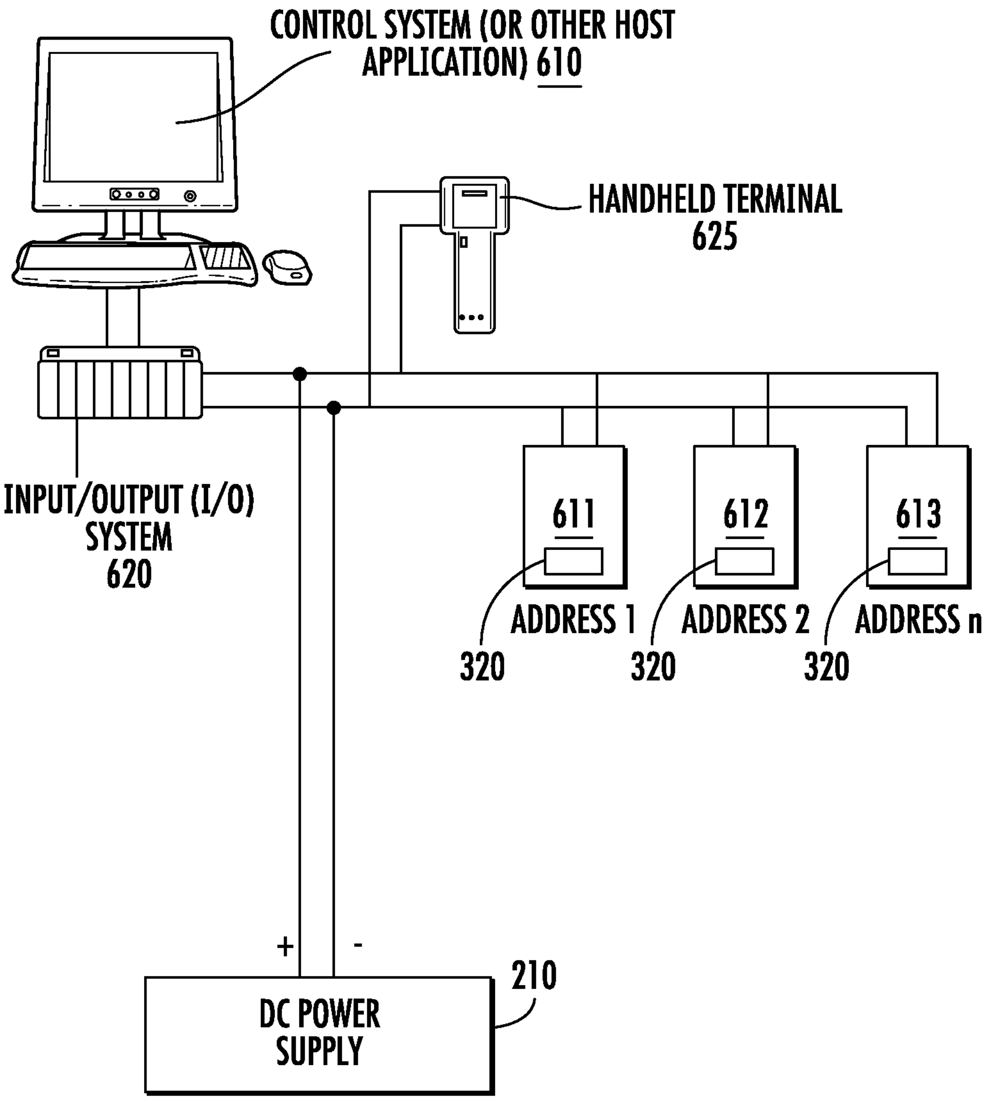
FIG. 6 depicts the multidrop mode of operation with field devices shown powered by a DC power supply having a master in the loop shown as a control system (or other host application) connected to the loop by an input/output (IO) system.

FIG. 6 depicts the multidrop mode of operation with field devices 611, 612 and 613 shown powered by a DC power supply 210 having a master in the loop shown as a control system (or other host application) 610 connected to the loop by IO system 620. A handheld terminal 625 is also shown coupled to the loop. The field devices 611, 612 and 613 each include a sensor module 320 including a disclosed controlled startup for multi-drop transmitters powered by current limited power supplies algorithm. All process values from the field devices 611, 612 and 613 are transmitted digitally. In the multidrop mode, all field device polling addresses are >0. As known in the art the multidrop connection shown is generally used for supervisory control installations that are widely spaced, such as pipelines, custody transfer stations, and tank farms.

The HART command set provides uniform and consistent communication for all field devices. The command set is known in the art to include three classes being universal, common practice, and device specific. Host applications may implement any of the necessary commands for a particular application. Each HART device has a 38-bit address that includes the manufacturer ID code, device type code, and device-unique identifier. For the identifier, a unique address is generally encoded in each field device at the time of manufacture. A HART master needs to know the address of a field device in order to communicate successfully with it. A HART master can learn the address of a slave device by issuing a HART commands that causes the slave device to respond with its address.

EXAMPLES

Disclosed embodiments are further illustrated by the following specific Examples, which should not be construed as limiting the scope or content of this Disclosure in any way.

As noted above 4 mA is a current value particular to the HART protocol. In analog current loop mode, the common range for DC current is between 4 and 20 mA. HART communication is superimposed over the analog loop value. The 4 mA is simply the constant current that will be maintained by each transmitter in the loop during normal operation. During startup the transmitter current is set to an error mode current of about 21 mA for some time period, such as for example for 3 seconds. Consider a hypothetical situation where there are 4 transmitters all configured in multidrop mode and the DC power supply can supply a maximum current of only 50 mA, say at 20 V.

One of the process variable transmitters is started first at a time t0 and it starts properly and then sets its loop current to 4 mA at t=3 seconds, which is the minimum non-error current for the 4 mA to 20 mA loop. Then at t1, say 10 seconds after t0, the next 3 process variable transmitters all start at the same time. The process variable transmitters each try to pull the error mode current of 21 mA, which is in addition to the 4 mA quiescent current pulled by the first process variable transmitter for a total attempting to be drawn current of 67 mA, which is more than the 50 mA capability of the power supply. As a result the next 3 process variable transmitters will fail to receive their needed current for startup. Such a startup failure generally requires a customer (typically an equipment maintenance tech) to go out to each process variable transmitter and manually power them ON in a staggered sequence which is at best annoying and resulting in process downtime, and at worst is potentially not even possible.

However, with disclosed startup sequencing for process variable transmitters, this startup problem would be detected by the startup sequencing algorithm at each process variable transmitter by monitoring the voltage across the energy storage device and all next 3 process variable transmitters would be placed in a low power mode for a different amount of time. This way the process variable transmitters later start up in a time staggered manner, such as having example respective low power state times of 10, 20 and 30 seconds. When the second process variable transmitter turns on, there is 4 mA constant current drawn by the first transmitter and only 1*21 mA drawn by the second transmitter considering the low power current negligible when compared with nominal operation current. The current supplied by the IO card/power supply will be approximately 25 mA.

When the third process variable transmitter turns on, there is 8 mA total constant current drawn by the first process variable transmitter and second transmitter, and 1*21 mA for the third process variable transmitter. When the fourth process variable transmitter turns on, there is 12 mA total constant current drawn by the first process variable transmitter, second process variable transmitter and third process variable transmitter, and 1*21 mA for the fourth process variable transmitter. In this example using a disclosed startup sequencing algorithm the power supply only needs to supply a maximum current of 33 mA which is less than the 50 mA current capability of the power supply. As a result the next 3 process variable transmitters will receive their needed current for startup and there will be no startup failures due to limited supply current capability.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, it may be possible to store energy in a coil based circuit/switcher. In addition, while a particular feature may have been disclosed with respect to only one of several implementations, such feature may be combined with one or more other features of the other implementations as may be desired and advantageous for any given or particular application.

The invention claimed is:

1. A method of operating process variable transmitters in a process control system of an industrial processing facility, comprising:

providing a plurality of process variable transmitters configured for sensing a process variable within the industrial processing facility each connected in parallel to a current loop that receives power from by a common power supply driving said current loop, said process variable transmitters each including a power accumulator module comprising an energy storage device that includes at least one capacitor or a rechargeable battery and a sensor module including a transceiver coupled to a processor having an associated memory that stores a startup sequencing algorithm;

after a fixed period of time following a startup, measuring a parameter relating to an input current charging said energy storage device received from said current loop, wherein the measuring of said parameter including:

measuring an initial node voltage between the positive and negative terminals of said energy storage device, and measuring a change in the voltage across the positive and negative terminals of said energy storage device over said fixed period of time to measure the input current charging said energy storage device;

comparing said parameter to a reference level for said parameter;

placing said process variable transmitter in a low power mode based on results of said comparing;

setting an at least partially random low power state time for said process variable transmitter, and restarting said startup sequencing algorithm after said low power state time.

2. The method of claim 1, wherein said parameter comprises an initial node voltage across said energy storage device, said startup sequencing algorithm comparing comprises comparing said initial node voltage to a predetermined voltage level, and wherein said placing comprises placing said process variable transmitter in said low power mode when said initial node voltage is less than said predetermined voltage level.

3. The method of claim 1, wherein said process variable transmitters further comprise a terminal module, said terminal module configured to connect to said current loop and provide power to said sensor module.

4. The method of claim 1, further comprising using a current drawn by said process variable transmitters from said current loop while in said low power mode to replenish and store energy.

5. The method of claim 1, wherein said setting said at least partially random low power state time comprises calculating times from a function seeded with a value from a noise source.

6. The method of claim 1, wherein said setting said at least partially random low power state time comprises generating times based on an assigned device identification number.

7. The method of claim 1, wherein said process variable transmitters comprise Guided Wave Radar (GWR) transmitters.

8. A process variable transmitter for sensing a parameter in a process control system within an industrial processing facility, comprising:

a terminal module configured to connect to a current loop that receives power from a power supply driving said current loop;

a sensor module receiving power through said terminal module including a power accumulator module comprising an energy storage device that includes at least one capacitor or a rechargeable battery and the sensor module including a transceiver coupled to a processor having an associated memory that stores a startup sequencing algorithm;

said sensor module implementing a method comprising:

after a fixed period of time following a startup comparing a parameter relating to an input current charging said energy storage device received from said current loop to a reference level for said parameter, wherein the measuring of said parameter including:

measuring an initial node voltage between the positive and negative terminals of said energy storage device, and measuring a change in the voltage across the positive and negative terminals of said energy storage device over said fixed period of time to measure the input current charging said energy storage device;

placing said process variable transmitter in a low power mode based on results of said comparing;

setting an at least partially random low power state time for said process variable transmitter, and restarting said startup sequencing algorithm after said low power state time.

9. The process variable transmitter of claim 8, wherein said setting said at least partially random low power state time comprises calculating times from a function seeded with a value from a noise source.

10. The process variable transmitter of claim 8, wherein said setting said at least partially random low power state time comprises generating times based on an assigned device identification number.

11. The process variable transmitter of claim 8, wherein said process variable transmitter further comprises said terminal module, said terminal module configured to connect to said current loop and provide power to said sensor module.

12. The process variable transmitter of claim 8, wherein said startup sequencing algorithm implements said comparing.

13. The process variable transmitter of claim 8, wherein said energy storage device comprises a plurality of said capacitors arranged in a capacitor bank.

14. The process variable transmitter of claim 8, wherein said process variable transmitters comprise Guided Wave Radar (GWR) transmitters.

15. The process variable transmitter of claim 8, wherein said parameter comprises an initial node voltage across said energy storage device, said startup sequencing algorithm comparing comprises comparing said initial node voltage to a predetermined voltage level, and wherein said placing comprises placing said process variable transmitter in said low power mode when said initial node voltage is less than said predetermined voltage level.

* * * * *